United States Patent [19]

Barua et al.

[11] 4,081,418
[45] Mar. 28, 1978

[54] EMULSIFIERS USEFUL FOR EMULSION POLYMERIZATION OF VINYL MONOMERS

[75] Inventors: Girish Chandra Barua, Stamford, Conn.; Herbert Burkhard, Eastchester, N.Y.

[73] Assignee: American Cyanamid Company, Stamford, Conn.

[21] Appl. No.: 685,038

[22] Filed: May 10, 1976

[51] Int. Cl.² .................... C08L 33/02; C08L 33/08; C08L 33/10
[52] U.S. Cl. .................... 260/29.6 MQ; 260/29.6 T; 260/29.6 TA; 526/209; 526/214; 526/304; 526/317; 526/328; 526/329
[58] Field of Search .............................. 526/209, 214; 260/29.6 MQ

[56] References Cited

U.S. PATENT DOCUMENTS

| | | | |
|---|---|---|---|
| 2,701,245 | 2/1955 | Lynn | 526/214 |
| 2,739,136 | 3/1956 | Kharasch et al. | 526/214 |
| 2,739,138 | 3/1956 | Kharasch et al. | 526/214 |

*Primary Examiner*—Harry Wong, Jr.
*Attorney, Agent, or Firm*—Gordon L. Hart

[57] ABSTRACT

In the emulsion polymerization of polymers which comprise monomers selected from acrylic acid, methacrylic acid, alkyl esters of those acids and which may also comprise other compatible vinyl monomers such as styrene, vinyl acetate, N-methylolacrylamide, acrylonitrile, itaconic acid and the like, the emulsifier for the emulsion polymerization is a surface-active agent having the formula

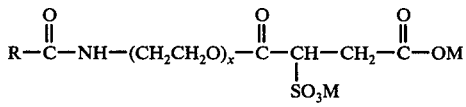

wherein

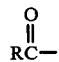

is the acyl radical of a fatty acid having 7 to 21 carbon atoms and M is selected from ammonium, the alkali metals, and certain alkaline earth metals, and $x$ is 1 to 3.

5 Claims, No Drawings

EMULSIFIERS USEFUL FOR EMULSION POLYMERIZATION OF VINYL MONOMERS

The invention relates to improvements in the manufacture of acrylic and other vinyl polymer latex emulsions.

It is known to polymerize acrylic, methacrylic acid, and esters of those acids by emulsion polymerization techniques thus making latex emulsions of the polymers and copolymers from those monomers. In some of the acrylate polymers prepared by this method, other vinyl monomers such as acrylonitrile, styrene, N-methylolacrylamide, itaconic acid and the like, are sometimes incorporated in the copolymers for purposes of modifying the latex product or to modify the polymer product to be made from the latex. These latex emulsions are produced in a number of variations that are useful for several applications such as making paints, paper coatings, binders for non-woven fabrics, in leather finishing, textile finishing, in resin compositions and the like.

In the aqueous emulsion of monomers to be used as the reaction mixture for emulsion polymerization, a very important ingredient in the emulsion is the surface-active agent which serves as the emulsifier for dispersing monomer reactants in the aqueous mixture. The selected emulsifier affects the emulsion polymerization reaction and consequently affects a number of properties of the resulting latex emulsions. Among such properties affected are the concentration of solids in the latex emulsion product, the emulsion stability of the latex product, the tolerance of the latex emulsion to change of pH, the latex emulsion viscosity, the particle size of the polymer particles in the latex emulsion, etc. The emulsifier also affects the ability to copolymerize the monomer mixtures and particularly those which contain certain comonomers which are usually difficult to copolymerize with the acrylate comonomers by emulsion polymerization methods. The selected emulsifier will sometimes also affect the ultimate use of the polymer, such as the properties of the polymeric films which are made by coating and drying a layer of latex emulsion on a surface to be treated.

According to the present invention, the series of surface-active agents having the formula

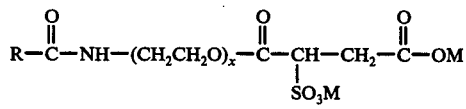

, wherein

is the acryl radical of a fatty acid having 7 to 21 carbon atoms and M is selected from the group consisting of ammonium, the alkali metals, and solubilizing alkaline earth metal cations such as calcium, magnesium and the like, and $x$ is 1 to 3.

We have found these surfactants to be excellent for use as emulsifiers for emulsion polymerization of monomer mixtures which comprise a substantial proportion of acrylic or methacrylic monomers. This particular class of surface-active agents is found to be effective for this use even when used at minimum concentrations which are less than the minimum amounts that are required with some of the other emulsifiers that previously had been used as emulsifiers for making acrylic latex emulsions. The present emulsifiers are found to be useful for making a variety of copolymers based on acrylate and methacrylate monomers.

The most preferred surface-active agent of the formula defined is the disodium salt of the half ester of the formula in which the

radical is the acyl residue from tall oil fatty acid, a mixed fatty acid in which R is predominantly $C_{18}$ aliphatic, and in which $x$ is one. This half ester is the surfactant selected for the detailed description of the invention in most of the examples. The half ester sulfosuccinates used for the present invention are known compounds and can be prepared by conventional known processes. Several processes that could be used to make these surfactants are described in U.S. Pat. No. 2,236,528.

EXAMPLE 1

Into 60 parts by wt. (pbw) of deionized water previously boiled, cooled and purged with nitrogen, are added 1 pbw of the surfactant disodium tall oil monoethanolamide sulfosuccinate, 1 pbw sodium bicarbonate, and 5 pbw methanol. A solution of 1 pbw ammonium persulfate and 9 pbw water is added. The mixture is purged with nitrogen for 15 minutes then transferred to a polymerization reactor and heated to 60° C. with continuous stirring and nitrogen purge. A separate addition vessel equipped with an agitator is charged with 49 pbw previously boiled and subsequently cooled deionized water 1.0 pbw of the same surfactant, 5 pbw methanol, 0.2 pbw sodium metabisulfite, followed by a charge of 66.5 pbw ethyl hexyl acrylate, 19 pbw methyl methacrylate, and 14.5 pbw methacrylic acid. The mixture is agitated to make an emulsion and is purged constantly with nitrogen. The mixture from the addition vessel is slowly run into the reactor at a rate of about 5 pbw per minute until about 15 percent of the mixture has been added. Addition is stopped until reaction is observed. Temperature is maintained at 60° C. in the reactor with heating or cooling as needed. Addition is resumed at about the same rate until completed, after which the reaction is continued for about 1 hour at 60° C. until reaction is complete.

EXAMPLE 2

Into 47 pbw of deionized water previously boiled, cooled, and purged with nitrogen are added 0.75 pbw of the surfactant disodium tall oil monoethanolamide sulfosuccinate, 1 pbw sodium bicarbonate, 5 pbw methanol. A solution of 1 pbw ammonium persulfate and 9 pbw water is added. The mixture is purged with nitrogen for 15 minutes then transferred to a polymerization reactor and heated to 65° C. with continuous stirring and nitrogen purge. A separate addition vessel equipped with an agitator is charged with 31 pbw deionized water, 0.75 pbw of the same surfactant, 5 pbw methanol, 0.2 pbw sodium bicarbonate, 78 pbw ethyl acrylate, 18 pbw methyl methacrylate, and 1 pbw itaconic acid. The mixture is agitated to make an emulsion and is purged constantly with nitrogen. The mixture from the addition vessel is slowly run into the polymerization reactor at a rate of about 5 pbw/minute until about 15 percent of the mixture has been added. Addition is stopped until reaction is observed. Temperature is maintained at 65° C. in the reactor. After initiation of the reaction is observed, a mixture of 7 pbw deionized water, 3 pbw N-methylolacrylamide is added to the monomer emulsion and mixed by agitation. Addition is resumed at the same rate until completed, after which the reaction is continued for about 1 hour at 65° C. until reaction is complete.

Testing The vessel is opened and the latex is removed and filtered to determine the wt. percent of filterable coagulum based on the total weight of latex produced. The vessel is rinsed with water and then inspected for wall coagulum. When wall coagulum is present, it is scraped off, dried and weighed.

The filtered latex is tested for mechanical stability by agitating a 50-ml. sample of the latex in a jar, by means of a twin-blade, high speed agitator rotating at 6300 rpm. Such agitation is continued for 15 minutes or for a shorter time if the emulsion breaks. After agitation for 15 minutes the latex is filtered and the coagulum which collects on the filter is weighed. In cases involving the acrylic polymers, when the emulsion breaks before 40 minutes the time in minutes required to break the emulsion is recorded.

To determine the percent solids in the emulsion, a weighed sample of the emulsion is placed on an aluminum dish and dried on a hot plate at 150° C. for 30 minutes, then weighed again. From the measured weights of the sample before and after drying, the percent solids composition of the emulsion is calculated.

Viscosity of the emulsion in centipoise is measured by a Brookfield Viscometer operating at room temperature.

Particle size of the polymer in the latex is determined using an electron microscope by the method described in U.S. Pat. No. 3,329,640.

Heat stability is measured in accordance with ASTM D1925-63T by the process described in U.S. Pat. No. 3,329,640.

Surface tension is measured by standard procedure.

EXAMPLES 2-17

By conventional procedures similar to those described in Examples 1 and 2, latex emulsions were made from each of the monomer mixtures described in Table 1 and the results from testing each latex are shown in Table 1.

The monomers that were used in the examples are identified by the abbreviation of each monomer as shown in the following list. The percent by weight of the total monomer charge is also shown in Table 1 for each monomer component identified.

The monomers used are identified as follows:

methyl methacrylate — MMA
2-ethylhexyl acrylate — EHA
methacrylic acid — MAA
ethyl acrylate — EA
acrylic acid — AA
styrene — S
butyl acrylate — BA
N-methylolacrylamide — NMA
methyl acrylate — MA
acrylonitrile — AN
vinyl acetate — VAc
itaconic acid — IA

TABLE 1

| | Wt. % each Monomer | | % Coagulum | % Solids | pH | Viscosity cps | Mechanical Stability min. | Part Size A |
|---|---|---|---|---|---|---|---|---|
| 1. | 66.5 | EHA | 0.4 | 45 | 5.25 | 50 | >27 | nm |
| | 19 | MMA | | | | | | |
| | 14.5 | MAA | | | | | | |
| 2. | 60 | S | 0.26 | 50 | 5.0 | 214 | >30 | nm |
| | 25 | EA | | | | | | |
| | 15 | AAA | | | | | | |
| 3. | 65 | MMA | negligible | 45 | 4.9 | 30 | >15 | 1250-1700 |
| | 30 | BA | | | | | | |
| | 5 | AA | | | | | | |
| 4. | 95 | BA | nm | 50 | nm | 23,350 | >19 | 1500-2200 |
| | 5 | NMA | | | | | | |
| 5. | 70 | BA | 0.6 | 50 | 5.4 | 50 | >15 | nm |
| | 29 | MA | | | | | | |
| | 1 | AA | | | | | | |
| 6. | 30 | BA | 0.11 | 45 | 5.7 | 24 | >25 | 600-1100 |
| | 27.5 | MMA | | | | | | |
| | 25 | S | | | | | | |
| | 10 | AN | | | | | | |
| | 7.5 | MAA | | | | | | |
| 7. | 80 | EA | negligible | 50 | 7.0 | 6.8 | >35 | nm |
| | 15 | S | | | | | | |
| | 5 | MAA | | | | | | |
| 8. | 66 | EA | 0.15 | 51.5 | 6.3 | 2430 | 5 | nm |
| | 31 | MMA | | | | | | |
| | 3 | NMA | | | | | | |
| 9. | 70 | BA | negligible | 45 | 47 | 1740 | >10 | 1000-2000 |
| | 29 | EHA | | | | | | |
| | 1 | AA | | | | | | |
| 10. | 95 | EA | 0.08 | 48 | 7.1 | 1065 | 36 | 1500-2200 |
| | 5 | NMA | | | | | | |
| 11. | 46 | BA | nm | 45 | nm | 320 | >15 | nm |
| | 46 | S | | | | | | |
| | 8 | NMA | | | | | | |
| 12. | 65 | VAc | negligible | 40 | 5.3 | 8,000 | | nm |
| | 30 | BA | | | | | | |
| | 5 | AA | | | | | | |
| 13. | 100 | EA | 0.08 | 40 | 8.0 | 32 | >15 | nm |
| 14. | 63 | VAc | negligible | 48.5 | 5.3 | 3,850 | >18 | nm |
| | 32 | EA | | | | | | |

TABLE 1-continued

| | Wt. %<br>each Monomer | % Coagulum | % Solids | pH | Viscosity cps | Mechanical<br>Stability<br>min. | Part Size<br>A |
|---|---|---|---|---|---|---|---|
| 15. | 3 NMA<br>2 AA<br>65 VAc<br>30 BA | negligible | 49.5 | 5.3 | 2,400 | >16 | |
| 16. | 5 AA<br>78.0 EA<br>18.0 MMA<br>3.0 NMA<br>1.0 IA | 0.1 | 50 | 6.2 | 776 | >21 | nm |
| 17. | 70 BA<br>28 EHA<br>2 AA | 0.14 | 63 | 5.25 | 6,100 | nm | nm |

The results shown in Table 1 demonstrate the versitility of the surfactant for use in making a variety of latex emulsions by emulsion polymerization of monomers comprising at least one monomer selected from acrylic and methacrylic acids and esters. Also, some of the mixtures comprise other compatible monomers. The several examples demonstrate the suitability of the surfactant in making several latex emulsions which have a variety of properties and which are useful in several different applications. The 95EA/5NMA latex, for example, is useful as a binder for making fabrics of non-woven fibers. The 70BA/28EHA/2AA latex is useful for making non-woven fabrics and for making pressure sensitive adhesives. The 27.5MMA/30BA/7.5-MAA/25S/10AN latex is useful for making acrylic floor polish formulations. Similarly, all of the latex emulsions are useful in one or another of the known uses for acrylate latex emulsions.

The emulsifier in all of the examples was effective at concentrations amounting to about 1.5 to 2 percent of the total weight of the monomers in the polymerization reaction mixture. Higher concentrations up to about 5 percent are effective but there is a definite cost advantage in using a selected emulsifier at its lowest effective concentration, which in the present case is lower than the minimum effective concentration for most of the prior art emulsifiers that are used for making acrylate latex emulsion.

A solution is prepared of 1.25 parts by wt. (pbw) of disodium oleylamidodiethoxy sulfosuccinate, 0.25 pbw of sodium di-(methylamyl)sulfosuccinate, 0.5 pbw ammonium persulfate, and 0.45 pbw sodium bicarbonate in 100 pbw of water. This solution is purged with nitrogen for 15 minutes, then transferred to a polymerization reaction vessel in which the solution is heated at 70° C. as the nitrogen purge is continued. Another liquid mixture of 85 pbw vinyl acetate and 15 pbw ethyl acrylate (85 VA/15EA) is purged with nitrogen for 15 minutes then transferred to an addition vessel. The nitrogen flow into the reaction is reduced to minimum as the addition of the monomer mix from the addition vessel is begun at a rate about 0.5 pbw per minute over about 3½ hours until all of the mixture has been added. The reaction content is continuously agitated throughout the addition and for about 1 hour after the last addition as the reaction is continued at 70° C. The reaction product is then cooled, filtered and stored in a container. Analysis and testing of the product shows that the latex contains 53.2 percent by wt. of solids. The conversion of monomers to polymer is 98.5 percent. The pH of the latex product is pH 5.2. Viscosity of the latex is 190 centipoise (Spindle #1, 20 RPM, Brookfield Viscometer Model RVF). A film made from the latex is clear and continuous. The particle size of solid in the latex is 1000 - 2000A (Peak of 90 percent of the particles). Surface tension of the latex is 47.5 dynes/cm. The wall coagulum is 0.022 percent and the filter coagulum is 0.034 percent. The emulsifier in this example is a compound of the formula shown above in which $x$ is two, M is sodium, and

is the acyl radical of oleic acid.

We claim:

1. A process for making a latex of emulsified polymer, said process comprising emulsion polymerization of a mixture of monomers including at least one monomer selected from the group consisting of acrylic acid, methacrylic acid and alkyl esters thereof, and which mixture may further comprise at least one other vinyl monomer selected from the group consisting of styrene, vinyl acetate, N-methylolacrylamide, acrylonitrile, and itaconic acid in an aqueous suspension containing a free radical polymerization catalyst and an emulsifier having the formula:

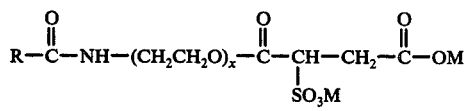

wherein

is the acyl radical of a fatty acid having 7 to 21 carbon atoms and

M is a solubilizing cation selected from ammonium, the alkali metals, and alkaline earth metals, and $x$ is 2 or 3.

2. A process defined by claim 1 wherein M is sodium.
3. A process defined by claim 1 wherein $x$ is 2.
4. A process defined by claim 3 wherein

is oleoyl.

5. A process defined by claim 4 wherein M is sodium.

* * * * *